US010221997B2

(12) United States Patent
Bopp

(10) Patent No.: US 10,221,997 B2
(45) Date of Patent: Mar. 5, 2019

(54) ENCLOSURE PRESSURIZATION DEVICE

(71) Applicant: Raytheon Company, Waltham, MA (US)

(72) Inventor: Jayson Kahle Bopp, Fishers, IN (US)

(73) Assignee: RAYTHEON COMPANY, Waltham, MA (US)

( * ) Notice: Subject to any disclaimer, the term of this patent is extended or adjusted under 35 U.S.C. 154(b) by 116 days.

(21) Appl. No.: 14/842,227

(22) Filed: Sep. 1, 2015

(65) Prior Publication Data
US 2017/0059090 A1 Mar. 2, 2017

(51) Int. Cl.
F16K 17/04 (2006.01)
F17C 7/00 (2006.01)
(Continued)

(52) U.S. Cl.
CPC ............... F17C 7/00 (2013.01); F16K 13/06 (2013.01); F16K 17/406 (2013.01); A62C 37/14 (2013.01); B60R 21/268 (2013.01); F17C 2201/0109 (2013.01); F17C 2201/058 (2013.01); F17C 2205/0314 (2013.01); F17C 2205/0317 (2013.01); F17C 2221/011 (2013.01);
(Continued)

(58) Field of Classification Search
CPC ......... Y10T 137/1624; Y10T 137/1632; Y10T 137/1639; Y10T 137/1647; Y10T 137/1797; Y10T 137/1812; Y10T 137/1963; Y10T 137/7043; Y10T 137/7062; Y10T 137/7065; Y10T 137/7724; Y10T 137/7737; Y10T 137/1782; B60R 21/268; B60R 21/274; B60R 21/264; B60R 21/2607; F16K 17/383; F16K 31/025; F16K 31/002; F16K 17/003; F16K 17/14; F16K 17/406
See application file for complete search history.

(56) References Cited

U.S. PATENT DOCUMENTS 1,891,183 A * 12/1932 Rowley ................ A62C 35/605
137/72
3,607,089 A * 9/1971 Stoesser ................ G01N 25/00
422/51
(Continued)

FOREIGN PATENT DOCUMENTS

DE 9402661 U1 * 4/1994 ............ A62C 2/243
WO WO 2014016809 A1 * 1/2014 ........... F16K 17/383

Primary Examiner — Reinaldo Sanchez-Medina
Assistant Examiner — Hailey K Do
(74) Attorney, Agent, or Firm — Renner, Otto, Boisselle & Sklar, LLP

(57) ABSTRACT

A pressurization device for pressurizing an enclosure may include a container containing a pressurized fluid, a pin that is inserted into the container, an actuator, and a heating device operably coupled to the actuator. The actuator may initially hold the pin in a closed position and allow the pin to move to an open position, disengaging from the container when the actuator increases in temperature. The pressurized fluid may force the pin toward the open position to release the pressurized fluid from the container. The actuator may include a frangible hollow bulb configured to fracture at a pre-defined temperature. The pressurized fluid may be vented into the enclosure through at least one fluid passage in fluid communication between the enclosure and the container.

13 Claims, 7 Drawing Sheets

(51) Int. Cl.
    *F16K 17/40*     (2006.01)
    *A62C 37/14*     (2006.01)
    *B60R 21/268*    (2011.01)

(52) U.S. Cl.
    CPC .. *F17C 2221/013* (2013.01); *F17C 2221/014* (2013.01); *F17C 2223/0123* (2013.01); *F17C 2223/035* (2013.01); *F17C 2270/0197* (2013.01); *Y10T 137/1797* (2015.04); *Y10T 137/1812* (2015.04)

(56) References Cited

U.S. PATENT DOCUMENTS

| | | | | |
|---|---|---|---|---|
| 3,638,733 A * | 2/1972 | De Rouville | A62C 99/009 | 137/72 |
| 3,670,925 A * | 6/1972 | Moyant | B60R 21/268 | 137/68.13 |
| 3,743,318 A * | 7/1973 | Yamaguchi | B60R 21/268 | 137/68.13 |
| 3,822,895 A * | 7/1974 | Ochiai | B60R 21/268 | 137/69 |
| 4,618,002 A * | 10/1986 | Mears | A62C 37/09 | 169/37 |
| 5,611,567 A * | 3/1997 | Hoo | B60R 21/268 | 280/737 |
| 5,906,394 A * | 5/1999 | Van Wynsberghe | F16K 13/04 | 222/5 |
| 6,286,536 B1 * | 9/2001 | Kamp | F16K 17/38 | 137/68.13 |
| 6,382,232 B1 * | 5/2002 | Portmann | F16K 13/06 | 102/275.1 |
| 8,800,587 B2 * | 8/2014 | Breuer | F16K 17/38 | 137/72 |
| 9,579,531 B2 * | 2/2017 | Muller | A62C 3/16 | |
| 2003/0106583 A1 * | 6/2003 | Weng | F16K 17/383 | 137/72 |
| 2011/0083756 A1 * | 4/2011 | Hwang | F16K 17/383 | 137/488 |
| 2014/0220469 A1 * | 8/2014 | Heise | F16K 31/002 | 429/442 |
| 2014/0261742 A1 * | 9/2014 | Heise | G01D 5/12 | 137/15.18 |
| 2017/0335984 A1 * | 11/2017 | Carter | F16K 17/406 | |

* cited by examiner

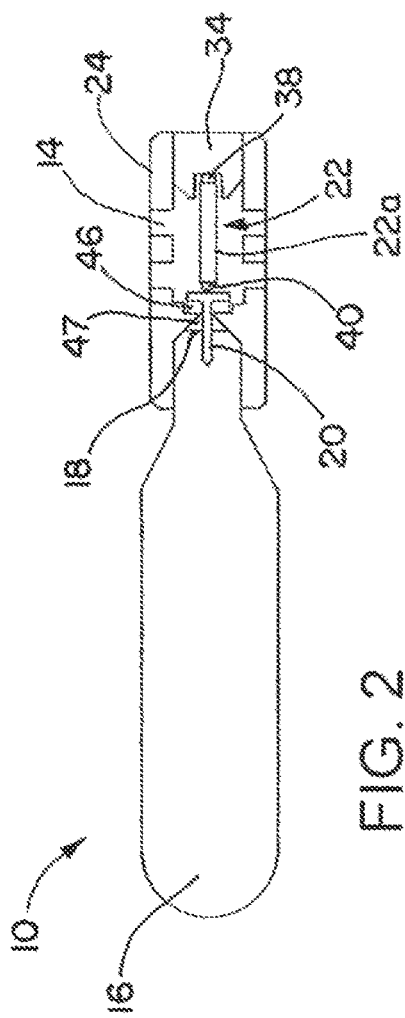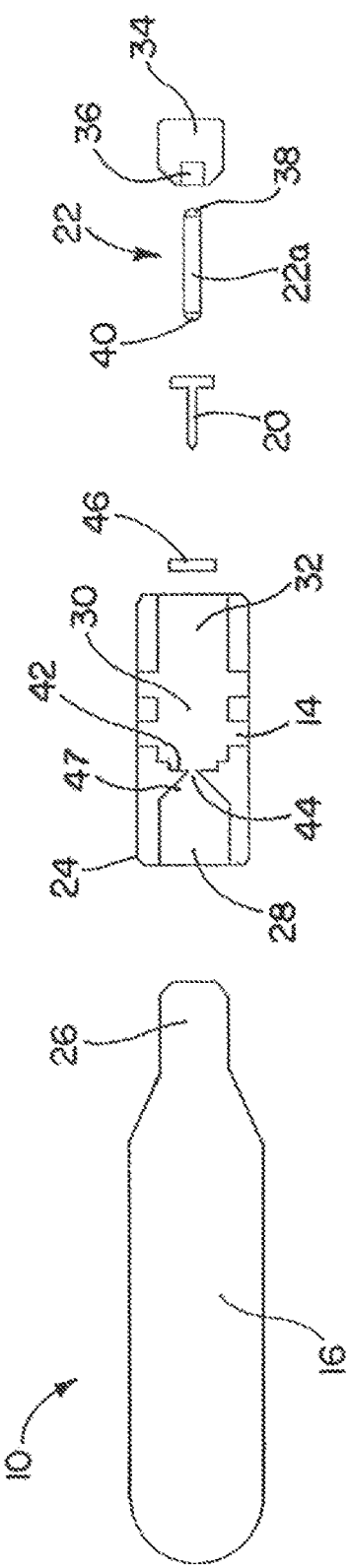

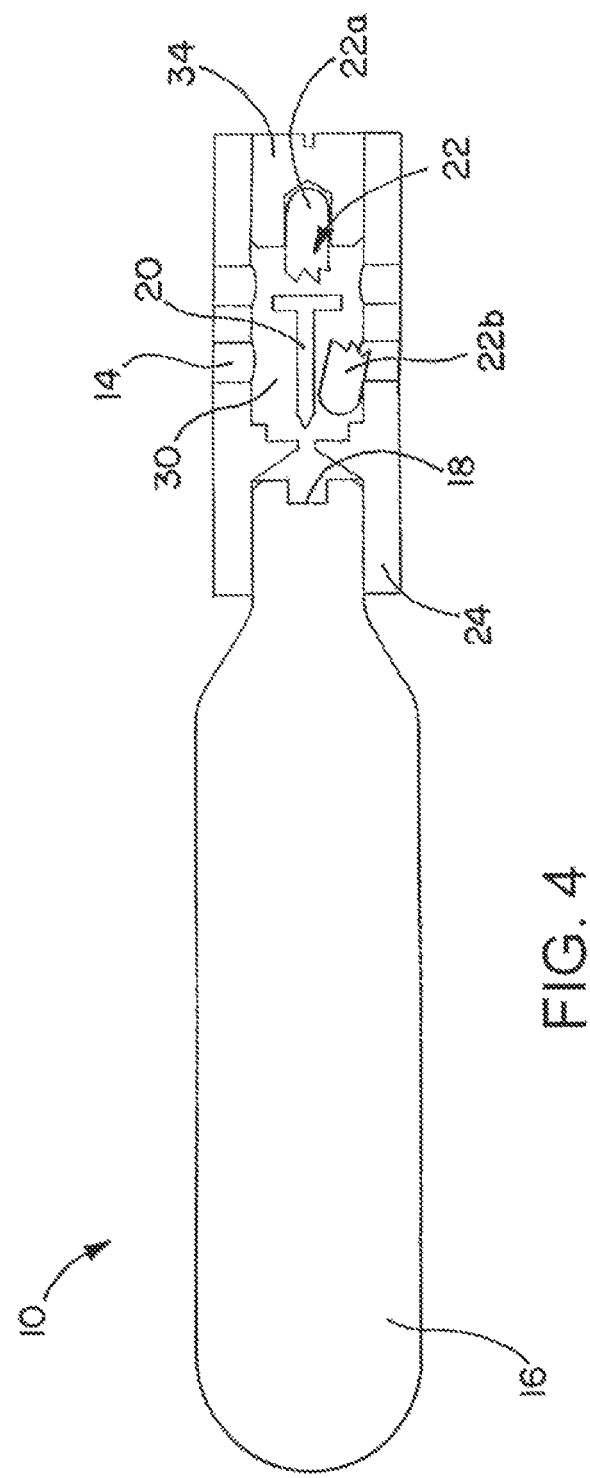

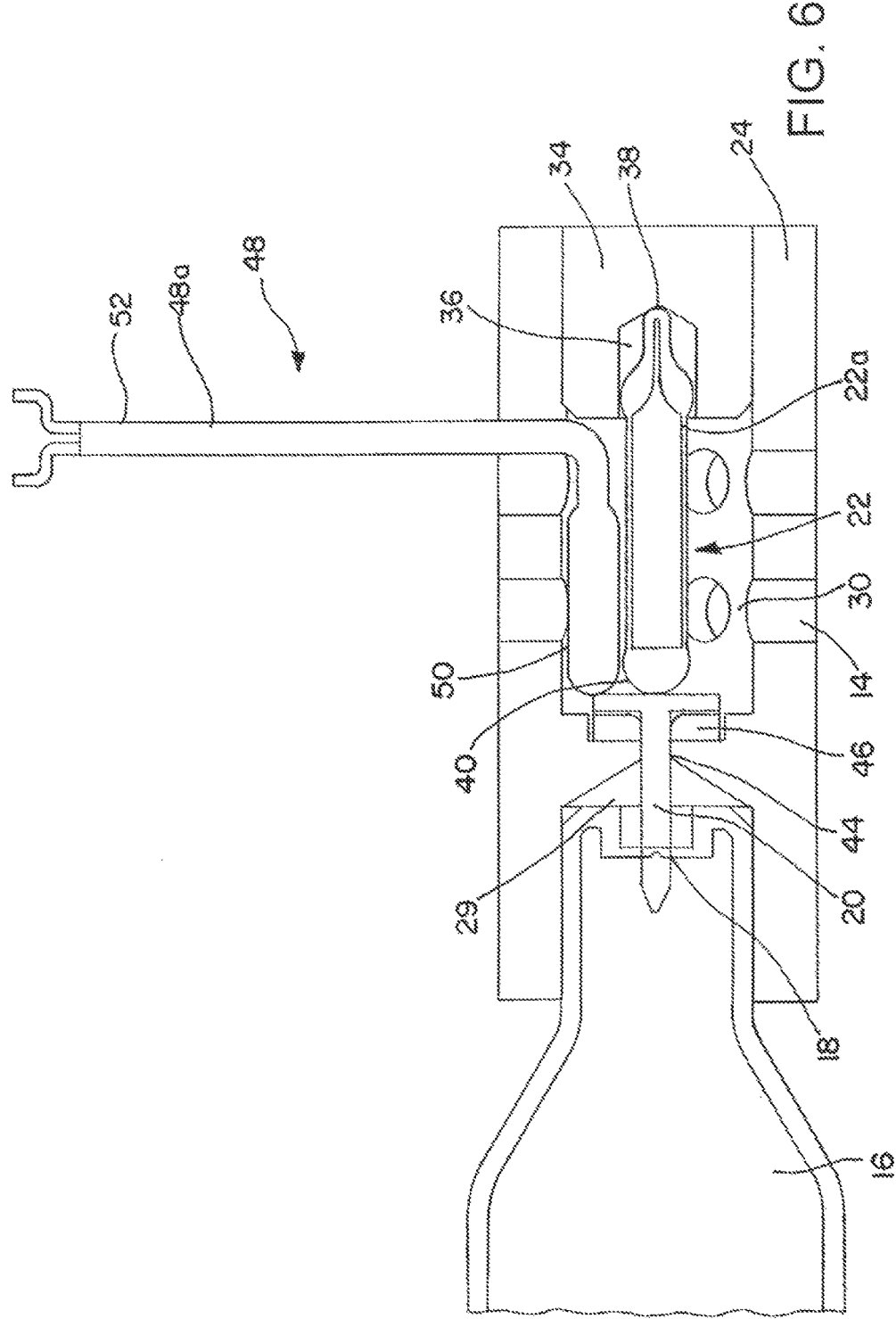

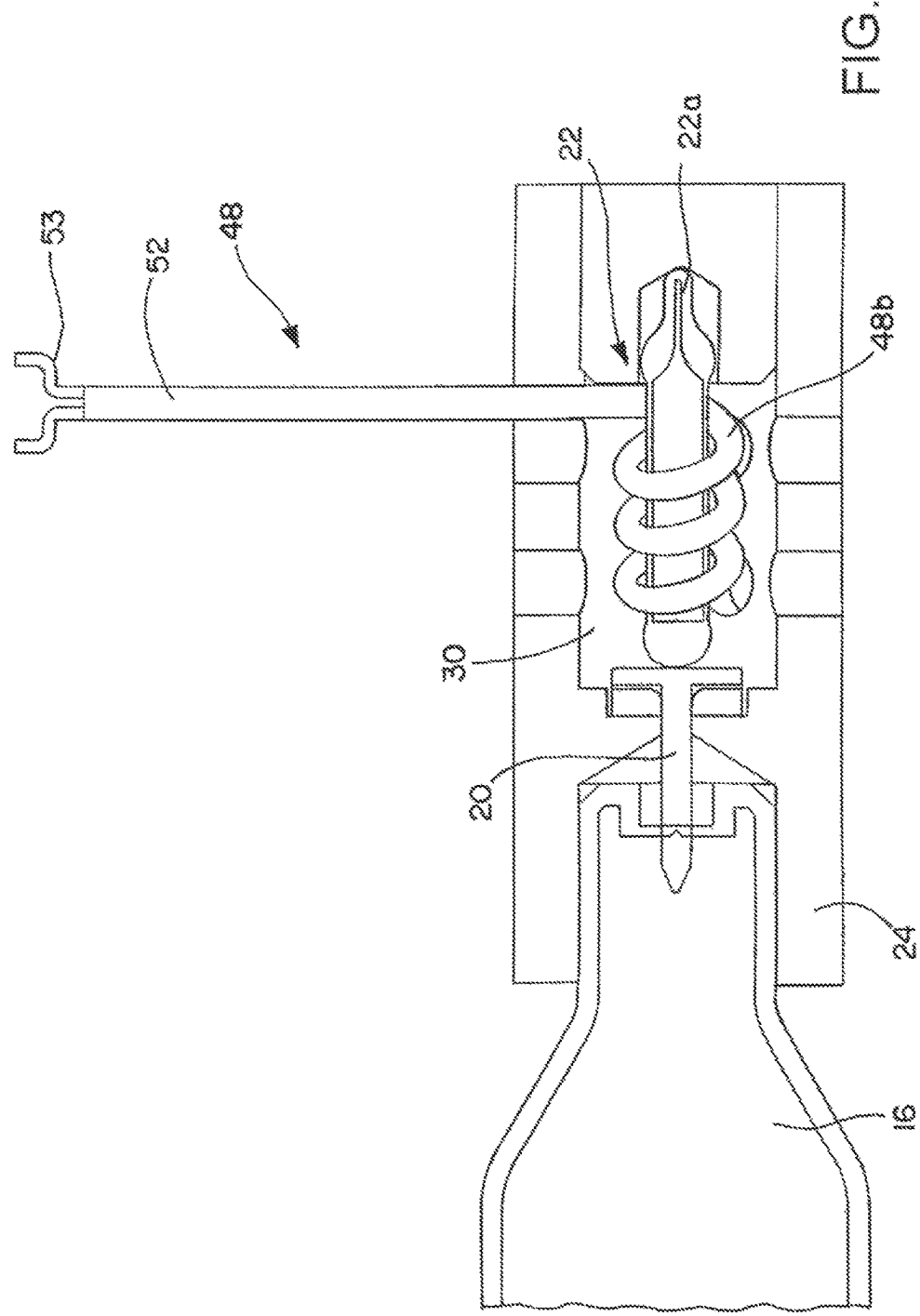

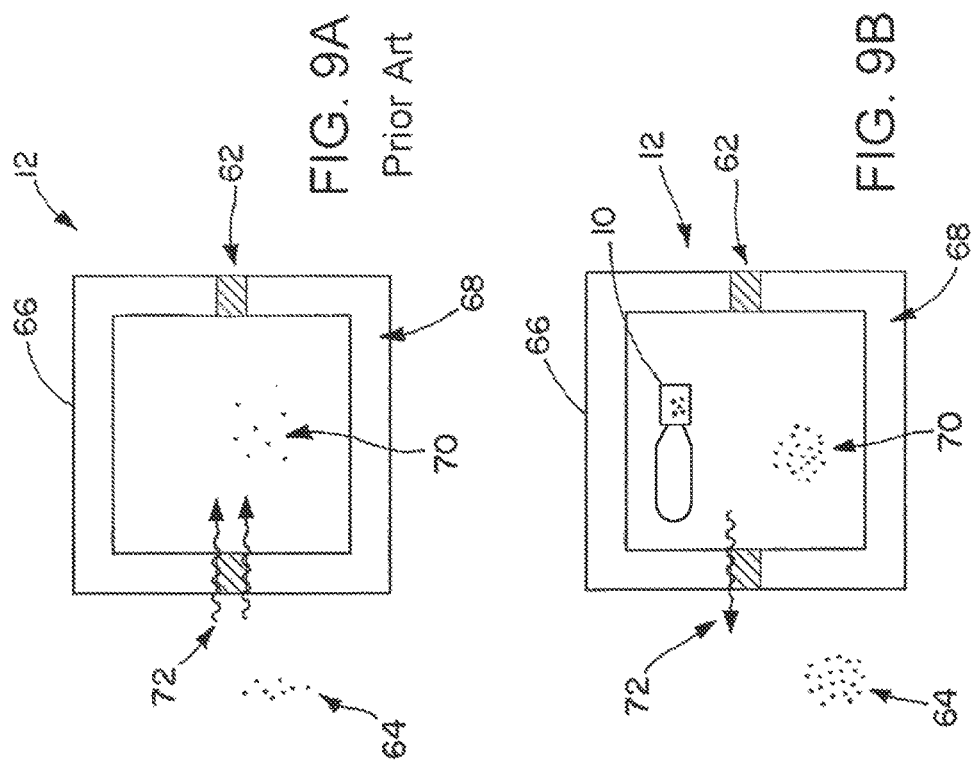
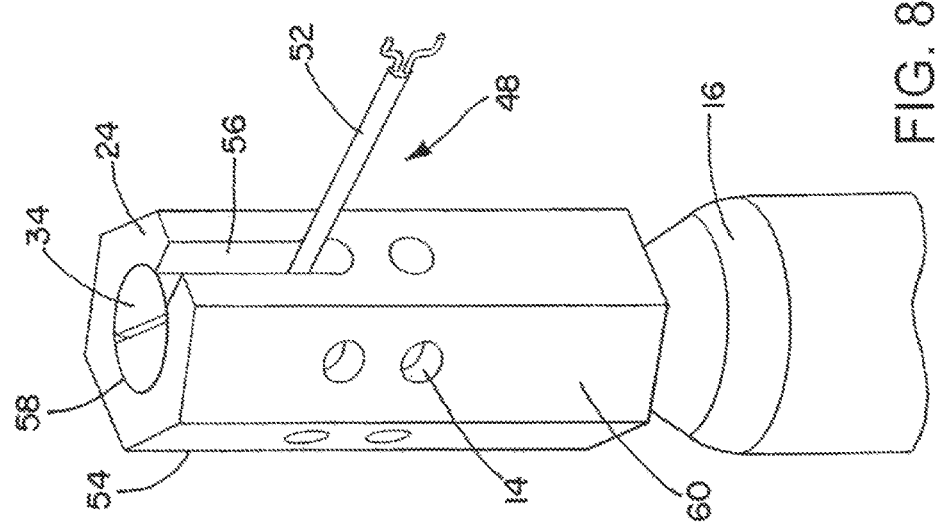

ENCLOSURE PRESSURIZATION DEVICE

FIELD OF THE INVENTION

The invention relates to pressurization of enclosures, and more particularly to quick activation pressurization devices.

DESCRIPTION OF THE RELATED ART

Various applications use an enclosure to enclose or seal the contents of the enclosure from an external environment having contaminants that are undesirable to the content of the enclosure. In certain applications, the enclosure may contain a device. When the enclosure is susceptible to leaks, the content of the enclosure may be exposed to the external environment.

One approach to preventing exposure of the enclosure to the external environment has been to prevent leakage in the enclosure. An attempt to prevent leakage has included sealing the seams of the enclosure with adhesive or gasketing. However, this may be cost prohibitive. Selecting the best sealing material to prevent a particular content from the external environment from entering into the enclosure may also be time-consuming. Furthermore, designing the seal to minimize the amount of exposed seams may lead to a complicated assembly process. Another approach has been to strengthen an external wall of the enclosure to resist the external pressure. However, this added material may make the enclosure heavy or too large for a particular application. Additionally, pre-pressurizing the enclosure may be undesirable in applications where the enclosure is inactive for years.

SUMMARY OF THE INVENTION

According to an aspect of the invention, a pressurization device includes: a container containing a pressurized fluid; a pin that is inserted into the container; and an actuator that initially holds the pin in a closed position. The actuator allows the pin to move to an open position, disengaging from the container to release the pressurized fluid from the container, when the actuator increases in temperature.

According to another aspect of the invention, a pressurization device for pressurizing an enclosure includes: a container containing a pressurized fluid; a pin that is inserted into the container; an actuator that initially holds the pin in a closed position; and a heating device operably coupled to the actuator. The actuator allows the pin to disengage from the container when the actuator increases in temperature. Pressurized fluid is then released from the container and vented into the enclosure through at least one fluid passage in fluid communication between the container and the enclosure.

According to another aspect of the invention, the actuator may be a thermally-responsive actuator that includes a frangible hollow bulb containing a liquid that increases pressure within the frangible hollow bulb in response to increased temperature, thereby fracturing the frangible hollow bulb and allowing disengagement of the pin. The heating device may be operably coupled to the frangible hollow bulb. The heating device may be an electric match or a resistive wire.

According to another aspect of the invention, the pressurization device may include a housing coupled to an end of the container and defining a chamber containing the actuator, wherein the pin moves into the chamber when disengaged from the container, allowing the pressurized fluid to be released into the chamber. The housing may receive a load screw that forces the actuator against the pin and may define at least one fluid passage allowing the pressurized fluid to be vented from the chamber of the housing.

According to another aspect of the invention, the pressurization device may be in combination with an enclosure to be pressurized, wherein the pressurized fluid is vented into the enclosure when released from the container.

According to another aspect of the invention, a method of pressurizing an enclosure includes: holding a pin in a container with a temperature sensitive actuator; and disengaging the pin from the container when the temperature sensitive actuator increases in temperature. The pin is inserted in the container to contain a pressurized fluid and the pressurized fluid is released from the container to pressurize the enclosure. The method can further include increasing the temperature of the actuator, using a heat device coupled to the temperature sensitive actuator. The method can further include increasing the temperature of a thermally-responsive frangible hollow bulb, wherein the frangible hollow bulb contains a liquid that increases pressure within the frangible hollow bulb in response to increased temperature, thereby fracturing the frangible hollow bulb and allowing disengagement of the pin.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 2 is a side sectional view of the pressurization device of FIG. 1.

FIG. 3 is an exploded view of the pressurization device of FIGS. 1 and 2.

FIG. 4 is a side sectional view of the pressurization device of FIGS. 1-3 showing the pressurization device when actuated.

FIG. 6 is a side sectional view of the pressurization device showing a first exemplary embodiment of an actuator in accordance with the present invention.

FIG. 7 is a side sectional view of the pressurization device showing a second exemplary embodiment of an actuator in accordance with the present invention.

FIG. 8 is an oblique view of the pressurization device and actuator.

FIG. 9A is a schematic of an enclosure.

FIG. 9B is a schematic of the enclosure of FIG. 9A containing the pressurization device in accordance with the present invention.

DETAILED DESCRIPTION

A pressurization device for pressurizing an enclosure has a container containing a pressurized fluid, a pin that is inserted into the container, and an actuator that initially holds the pin in a closed position. The actuator allows the pin to move to an open position, disengaging from the container to release the pressurized fluid from the container, when the actuator increases in temperature. The pressurization device may include a heating device operably coupled to the actuator. The actuator may be quickly activated to release a pre-determined amount of the pressurized fluid to positively pressurize the enclosure.

Figure 1:
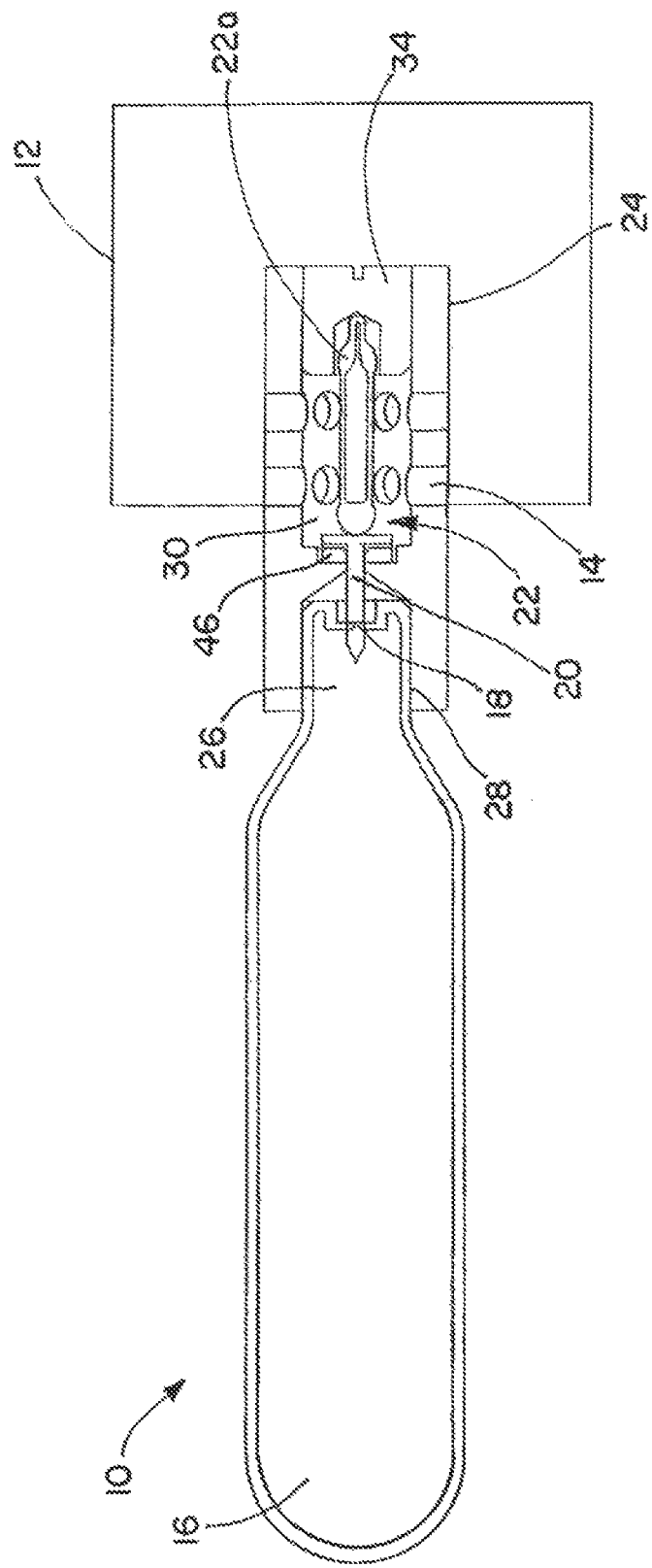
FIG. 1 is a side sectional view of a pressurization device for pressurizing an enclosure in accordance with an exemplary embodiment of the present invention.

FIG. 1 shows a pressurization device 10 for pressurizing an enclosure 12. The enclosure 12 may seal the contents of the enclosure 12 from an external environment which may have contaminants harmful to the contents. The enclosure may contain a device to be pressurized and may have any suitable dimension or shape. The pressurization device 10 includes at least one passage 14 in fluid communication between a container 16 containing a pressurized fluid and the enclosure 12. The container 16 may store the pressurized fluid until actuation of the pressurization device 10. FIG. 1 shows an exemplary embodiment of the pressurization device 10 where the container 16 is located at least partially outside the enclosure 12. The container 16 includes a hole 18 for receiving a pin 20. The pin 20 is held in the hole 18 by an actuator 22 configured to allow the pin 20 to disengage from the container 16 when the pressurization device 10 is actuated. Upon actuation of the pressurization device 10, the pressurized fluid can be vented into the enclosure 12 through the passage 14. The passage 14 may be defined by a housing 24. An end 26 of the container 26 is received in a container receiving aperture 28 of the housing 24 such that the housing 24 is coupled to the container 16.

Referring in addition to FIGS. 2 and 3, the container 16 may store the pressurized fluid until actuation of the pressurization device 10. The pressurized fluid may be any suitable fluid or gas for a particular application. Examples of suitable gases are nitrogen, carbon dioxide, nitrous oxide, or an inert gas that does not undergo a reaction if exposed to the external environment. In certain applications such as medical applications, the gas could be oxygen. The container 16 may be cylindrical in shape. The container 16 may include any suitable gas or quantity.

FIGS. 1-2 show the container 16 defining a hole 18 receiving a pin 20 to contain the pressurized fluid. The pin 20 is inserted into the hole 18 when in a closed position. The pin 20 may be a piercing pin and the hole 18 may be a pin hole. The pin 20 may be formed of a suitable material. An example of a suitable material is steel or aluminum. The pin 20 may be held in the closed position by an actuator 22. The actuator 22 is configured to hold the pin 20 until the actuator 22 fractures or breaks. The actuator 22 may include a material that is temperature sensitive and changes state when heat is applied to the actuator 22. In response to the changing state of the material, the force holding the pin 20 in the container 16 may decrease, allow the pressurized fluid to force the pin 20 away from the container 16. As shown in FIGS. 1-3, an exemplary embodiment of the actuator 22 includes a thermally responsive actuator 22 that includes a frangible hollow bulb 22a. The frangible hollow bulb 22a may be a glass bulb. The frangible hollow bulb 22a may contain a liquid that is stable at the temperature of the environment in which the pressurization device 10 is stored or unactuated. The liquid may be a liquid that chemically expands in volume in response to increased temperature. The liquid is suited to increase pressure within the frangible hollow bulb 22a in response to increased temperature. The increase in pressure causes the frangible hollow bulb 22a to fracture and allows disengagement of the pin 20 from the container 16. The temperature at which the frangible hollow bulb 22a breaks may be pre-defined in a particular application.

Another exemplary embodiment of the actuator may include a mechanical linkage configured to hold the pin 20 in the container 16 and collapse in response to an applied force, allowing the pressurized fluid to force the pin 20 away from the container 16. The applied force may be from a chemical reaction, such as an explosion, or from an electrical reaction, such as an electro-magnet. Another exemplary embodiment of the actuator may include a wax plug configured to hold the pin 20 in the container 16 and melt in response to heat applied to the wax plug. In a cold-weather application, the actuator may include an ice plug configured to melt.

FIG. 3 is an exploded view of the pressurization device 10 illustrating the housing 24 defining a container receiving aperture 28 and a load-screw-receiving aperture 32. The housing 24 may be positioned along a longitudinal axis of the container 16. The housing 24 may support an end 26 of the container 16 and define the chamber 30 containing the actuator 22. The load-screw-receiving aperture 32 may receive a load screw 34. The housing 24 supports the load screw 34 that is positioned to force the actuator 22 against the pin 20 and seal the chamber 30 of the housing 24. The load screw 34 may include an actuator receiving aperture 36 for receiving and supporting a first end 38 of the actuator 22. The actuator 22 may be positioned along the longitudinal axis of the housing 24 and has a second end 40 that engages a surface of the pin 20. The housing 24 has a gasket seat 42 and a pin receiving aperture 44. The pressurization device 10 may include a gasket 46 seated against the gasket seat 42 for sealing the container receiving aperture 28 of the housing 24. As best shown in FIGS. 2 and 3, the container receiving aperture 28 may also include a pressure relief space 47 defined between the hole 18 and the pin receiving aperture 44. The gasket 46 may define a recess through which the pin 20 extends. The gasket 46 is pressed against the gasket seat 42 by the pin 20 when the pressurization device 10 is assembled. The housing 24, gasket 46, pin 20, actuator 22, and load screw 34 may be located along the longitudinal axis of the container 16. The pin receiving aperture 44 may be axially aligned with the hole 18 of the container 16 such that when the pin 20 is inserted into the container 16, it axially extends through the gasket 46, the pin receiving aperture 44, the pressure relief space 47 of the container receiving aperture 28 and the hole 18. The housing 24 may further define at least one fluid passage 14 allowing the pressurized fluid to be vented from the chamber 30 of the housing 24.

FIG. 4 shows the pin 20 in the open position upon actuation of the pressurization device 10. When the frangible hollow bulb 22a of the actuator 22 is subjected to heat from a heating device (not shown in FIG. 4) operably coupled to the actuator 22, the actuator 22 fractures or breaks within the chamber 30. The load screw 34 remains fixed in the housing 24, and the fragmented pieces 22b of the actuator 22 are retained in the housing 24. The pin 20 is forced out of the container 16 and toward the open position by the force of the pressurized fluid, and into the chamber 30. The pressurized fluid fills the chamber 30 of the housing 24. The pressurized fluid is then vented out of the chamber 30 via at least one fluid passage 14 defined on an exterior surface of the housing 24. As shown in FIGS. 1-4, the at least one fluid passage 14 may include a plurality of fluid passages located on the exterior surface of the housing 24 in fluid communication with the enclosure.

Figure 5:
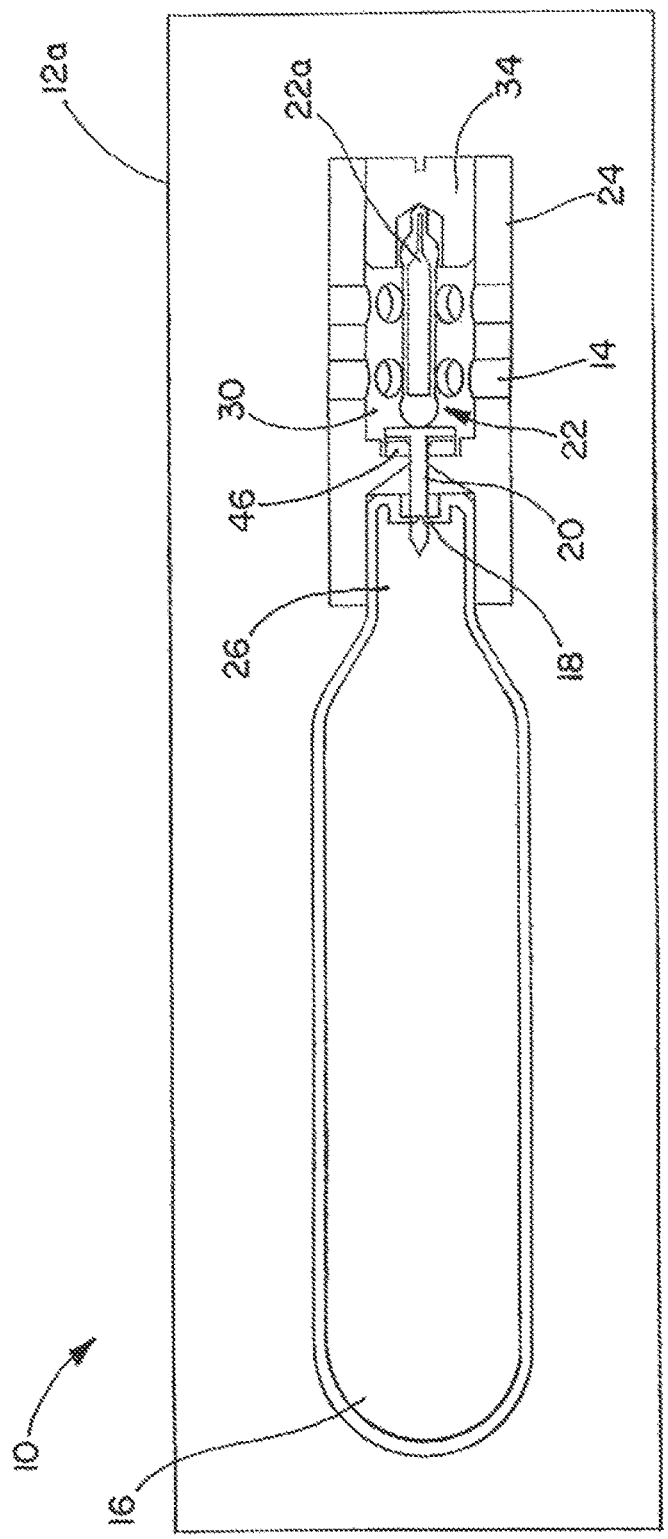
FIG. 5 is a side sectional view of the pressurization device of FIGS. 1-3 showing a second exemplary embodiment of the enclosure.

FIG. 5 shows another exemplary embodiment of the pressurization device 10 including the container 16 and the housing 24 located in the enclosure 12a such that the enclosure 12a surrounds the device 10. The end 26 of the housing 24 is coupled to the container 16 and defines the chamber 30 containing the frangible hollow bulb 22a of the actuator 22, as previously described. The housing 24 also contains the load screw 34, the pin 20, and the gasket 46, as previously described. At least one passage 14 is defined by the housing 24 for venting pressurized fluid into the enclosure 12a.

FIGS. 6 and 7 show the pressurization device 10 including an exemplary embodiment of a heating device 48 operably coupled to the actuator 22. FIG. 6 shows the heating device 48 may include a pyrotechnic initiator such as an electric match 48a. The electric match 48a may include a shroud 50 disposed within the chamber 30 of the housing 24 adjacent the frangible hollow bulb 22a of the actuator 22. The second end 40 of the frangible hollow bulb 22a of the actuator 22 may be held against the pin 20 inserted in the container 16 and the first end 38 of the frangible hollow bulb 22a may be supported in the actuator receiving aperture 36 of the load screw 34. The shroud 50 may contain a pyrogen and a bridgewire. The electric match 48a may include a lead wire 52 for electrical communication between the bridgewire and a direct current source (not shown). When the direct current is applied to an end of the lead wire, the bridgewire may rapidly heat and ignite the pyrogen, which burns rapidly at a high temperature. The increased temperature may heat the frangible hollow bulb 22a of the actuator 22 until it fractures. The electric match 48b may also break due to overheating and the circuit may be opened. When the frangible hollow bulb 22a of the actuator 22 fractures, the pressurized fluid forces the pin 20 out of the hole 18 of the container 16, allowing the pressurized fluid to pass through the pressure relief space 47 and the pin receiving aperture 44 to fill the chamber 30 of the housing 24. The housing 24 may retain the pin 20 and the fractured parts of the frangible hollow bulb 22a. The pressurized fluid may be vented out of the chamber 30 through the at least one passage 14. It is contemplated that the heating device could be used in applications that currently use thermal batteries. In this application, the lead wire 52 of the heating device 48 could be attached directly to the thermal battery. When the thermal battery is activated, the heating device 48 would also be activated without any additional initiating or control circuitry.

FIG. 7 shows another exemplary embodiment of the heating device 48, that includes a resistive wire 48b operably coupled to the frangible hollow bulb 22a of the actuator 22. The resistive wire 48b has a lead wire 52 and ends 53 attached to a circuit board (not shown). When pressurization of the enclosure is desired, current is applied to the wire 48b to heat the wire 48b and the chamber 30 of the housing 24. Heat in the chamber 30 causes the frangible hollow bulb 22a to fracture, allowing the pin 20 to disengage from the cylinder 16 as previously described. The wire 48b may also break due to overheating and the circuit may be opened. In this application, the resistive wire 48b could be attached directly to the thermal battery. When the thermal battery is activated, the resistive wire 48b would also be activated without any additional initiating or control circuitry.

FIG. 8 shows an exemplary embodiment of the housing 24 of the pressurization device 10. By way of example and not limitation, an exterior surface 54 of the housing 24 may be hexagonal in shape. The housing 24 may define a slot 56 for receiving lead wires 52 of the heating device 48. The housing 24 may have an interior surface 58 which is cylindrical and defines the chamber of the housing. The exterior surface 54 may include faces 60 such that each of the faces 60 of the exterior surface 54 has at least one fluid passage 14 for venting the pressurized fluid out of the chamber of the housing 24. The slot 56 may also act as a fluid passage. The housing 24 may be formed of steel or aluminum. The slot 56 may be formed on one of the faces 60 and allow insertion of the heating device 48 after assembly of the container 16, housing 24, actuator, and load screw 34.

FIGS. 9A and 9B show the enclosure 12 having a seal 62. The enclosure 12 is surrounded by a high-pressure external environment 64 and includes a cover 66 and a housing 68, separating the contents of the enclosure 12 from the external environment 64. The enclosure 12 includes an internal environment 70. FIG. 9A shows the enclosure 12 having a low pressure internal environment 70 inside the enclosure 12, such that a large amount of leakage of the external environment enters into the internal environment 70 through a leak 72. FIG. 9B shows the enclosure 12 having the pressurization device 10 within the internal environment 70. When the pressurization device 10 is actuated, the internal environment 70 becomes a high pressure environment, having a higher pressure than the external environment 64. With the pressurization device 10, the enclosure 12 allows for a small amount of leakage from the internal environment 70 to exit through the leak 72 to the external environment 64. As a result, the contents of enclosure 12, in FIG. 9B, are protected from the contaminants in the external environment 70.

A method of pressurizing an enclosure 12 includes holding a pin 20 in a container 16 with a temperature sensitive actuator 22 and disengaging the pin from the container 16 when the temperature sensitive actuator 22 increases in temperature. The pin 20 is inserted in the container 16 to contain a pressurized fluid and the pressurized fluid is released from the container 16 to pressurize the enclosure 12. The method may include increasing the temperature of the actuator, using a heat device coupled to the temperature sensitive actuator 22. The method may include increasing the temperature of a thermally-responsive frangible hollow bulb 22a. The frangible hollow bulb 22a may contain a liquid that increases pressure within the frangible hollow bulb 22a in response to increased temperature, such that the frangible hollow bulb 22a is fractured and disengagement of the pin 20 is allowed.

The miniature enclosure pressurization device and method has advantages over currently used pressurization devices and methods used to pressurize enclosures. The device is economical to manufacture and has the ability to quickly activate and pressurize an enclosure after years of inactivity. The device is also advantageous in its miniature size. The device is a one-time use device and is not constrained to a particular gas or quantity such that the container for containing the pressurized fluid may be filled with an amount of gas and the type of gas that is pre-determined to meet the expected environment. In high-pressure environments, the internal pressurization of the pressurization device decreases the pressure differential across the seal between the enclosure and the external environment, reducing the chances of bursting the seal. The housing of the device retains the pin after actuation to provide an additional safety advantage.

Examples of applications using enclosures may include single use weapons and medical isolations suits. During flight of a single use weapon, such as a missile, rocket exhaust may be harmful if it enters the missile enclosure. The exhaust may re-ignite due to the high temperature of the gas and the available oxygen inside the missile. Leaks in the seal of the enclosure would also allow contaminants from the external environment to interfere with any electronics enclosed. The miniature enclosure pressurization device may be advantageous for use in pressurizing an enclosure that is a missile. The miniature pressure vessel may remain armed, but unused for years. The pressurization device may be activated seconds before launch and may pressurize the missile to protect it during its flight. Over-pressurizing the missile enclosure allows any leaks in the enclosure to push gas out of the enclosure and protect the contents from burning or melting.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressurization device comprising:
   a container containing a pressurized fluid;
   a pin that is inserted into the container;
   an actuator that initially holds the pin in a closed position, and that allows the pin to move to an open position when the actuator increases in temperature, thereby disengaging from the container to release the pressurized fluid from the container; and
   a housing coupled to an end of the container and defining a chamber containing the actuator, wherein the pin moves into the chamber and is contained within the chamber when disengaged from the container, allowing the pressurized fluid to be released into the chamber;
   wherein the actuator is a thermally-responsive actuator that includes a frangible hollow bulb containing a liquid that increases pressure within the frangible hollow bulb in response to increased temperature, thereby fracturing the frangible hollow bulb and allowing disengagement of the pin,
   wherein an electric heating device that heats the frangible hollow bulb is operably coupled to the frangible hollow bulb, the electric heating device being formed non-integrally with the housing and having a first end insertable into the chamber to be contained within the chamber, the first end being adjacent and external to the frangible hollow bulb, the electric heating device having a second end opposite the first end and located outside the chamber for actuation of the electric heating device, and
   wherein the housing defines a u-shaped slot extending from an open end of the housing, the u-shaped slot being in communication with the chamber of the housing and being configured to receive the electric heating device for insertion of the electric heating device into the chamber, whereby the pressurized fluid flows out of the chamber through the u-shaped slot.

2. The pressurization device of claim 1, wherein the electric heating device is an electric match.

3. The pressurization device of claim 1, wherein the electric heating device is a resistive wire.

4. The pressurization device of claim 1, wherein the housing receives a load screw that forces the actuator against the pin.

5. The pressurization device of claim 1, wherein the housing defines at least one fluid passage allowing the pressurized fluid to be vented from the chamber of the housing.

6. The pressurization device of claim 5, in combination with an enclosure to be pressurized, wherein the pressurized fluid is vented into the enclosure when released from the container.

7. The pressurization device of claim 1, wherein the housing is polygonal in shape and has a plurality of faces that define an exterior surface of the housing.

8. The pressurization device of claim 7, wherein the housing is hexagonal in shape.

9. The pressurization device of claim 7, wherein the u-shaped slot is formed on one of the plurality of faces.

10. The pressurization device of claim 9, wherein a plurality of vent holes are formed on the faces and in communication with the chamber of the housing.

11. The pressurization device of claim 7, wherein the housing has an interior surface that is cylindrical.

12. A method of pressurizing an enclosure, the method comprising:
    holding a pin in a container with a temperature sensitive actuator located in a chamber of a housing that is separable from the container, wherein the pin is inserted in the container to contain a pressurized fluid, wherein the temperature sensitive actuator is a thermally-responsive frangible hollow bulb, wherein the frangible hollow bulb contains a liquid that increases pressure within the frangible hollow bulb in response to increased temperature, thereby fracturing the frangible hollow bulb and allowing disengagement of the pin;
    inserting an electric heating device into a u-shaped slot formed in the housing and extending from an open end of the housing, the u-shaped slot being in communication with the chamber of the housing and being configured to receive the electric heating device for insertion of the electric heating device into the chamber;
    increasing the temperature of the temperature sensitive actuator using the electric heating device coupled to the temperature sensitive actuator, the electric heating device being formed non-integrally with the housing and having a first end insertable into the chamber to be contained within the chamber, the electric heating device being adjacent and external to the frangible hollow bulb, the electric heating device having a second end opposite the first end and located outside the chamber for actuation of the electric heating device; and disengaging the pin from the container when the temperature sensitive actuator increases in temperature, wherein the pin moves into the chamber, the pin being retained by the container and the pressurized fluid being released from the container to flow at least partially through the u-shaped slot to pressurize the enclosure.

13. The method of claim 12, further comprising releasing the pressurized fluid out of the chamber through the u-shaped slot formed in the housing.

* * * * *